(12) United States Patent
Wilensky

(10) Patent No.: US 7,003,061 B2
(45) Date of Patent: Feb. 21, 2006

(54) IMAGE EXTRACTION FROM COMPLEX SCENES IN DIGITAL VIDEO

(75) Inventor: Gregg D. Wilensky, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 592 days.

(21) Appl. No.: 09/747,945

(22) Filed: Dec. 21, 2000

(65) Prior Publication Data

US 2002/0118875 A1 Aug. 29, 2002

(51) Int. Cl.
*H04N 9/97* (2006.01)
*H04N 7/18* (2006.01)
*G06K 9/36* (2006.01)

(52) U.S. Cl. ................ 375/360; 348/135; 385/283

(58) Field of Classification Search ............ 348/239, 348/240, 241, 242, 243, 446, 135; 375/360; 382/283, 154, 194, 146, 199, 256, 266, 284, 382/282; 345/591; H04N 7/18, 9/47; G06K 9/36
See application file for complete search history.

(56) References Cited

U.S. PATENT DOCUMENTS

| | | | | |
|---|---|---|---|---|
| 5,355,446 A | 10/1994 | Maayan | ................. | 395/134 |
| 5,675,669 A | 10/1997 | Kim | | |
| 5,912,994 A * | 6/1999 | Norton et al. | ............. | 382/283 |
| 5,914,748 A * | 6/1999 | Parulski et al. | ............. | 348/239 |
| 6,002,797 A | 12/1999 | Mori et al. | ................. | 382/173 |
| 6,008,865 A | 12/1999 | Fogel | ................. | 348/700 |

(Continued)

FOREIGN PATENT DOCUMENTS

| | | |
|---|---|---|
| GB | 2121534 A | 12/1983 |
| JP | 10164436 | 6/1998 |
| JP | 2000069368 | 3/2000 |

OTHER PUBLICATIONS

Gunn, et al., "A Robust Snake Implementation; A Dual Active Contour", pp. 63-67, IEEE Transactions on Pattern Analysis and Machine Intelligence, vol. 19, No. 1, Jan. 1997.

(Continued)

*Primary Examiner*—Tung Vo
(74) *Attorney, Agent, or Firm*—Fish & Richardson P.C.

(57) ABSTRACT

The invention provides methods and apparatus, including computer program products, implementing and using techniques for masking and extracting a foreground portion from a background portion of a digital image. In the method, a first input defining a first border region is received, which includes at least a part of the foreground portion and at least a part of the background portion in a first digital image. A second input defining a second border region is received, which includes at least a part of the foreground portion and at least a part of the background portion in a second digital image. An intermediary border region is interpolated for an image intermediary in time to the first and second digital images and the first, second, and intermediary border regions are used for masking the foreground portion from the background portion in the digital video.

40 Claims, 10 Drawing Sheets

U.S. PATENT DOCUMENTS

| | | | |
|---|---|---|---|
| 6,035,060 | A | 3/2000 | Chen et al. |
| 6,088,392 | A | 7/2000 | Rosenberg |
| 6,128,046 | A | 10/2000 | Totsuka et al. |
| 6,300,955 | B1 | 10/2001 | Zamir ................. 345/433 |
| 6,301,385 | B1 | 10/2001 | Chen et al. |
| 6,429,875 | B1 * | 8/2002 | Pettigrew et al. ........... 345/591 |
| 6,556,704 | B1 * | 4/2003 | Chen ..................... 382/154 |
| 6,570,624 | B1 * | 5/2003 | Cornog et al. ............ 348/446 |
| 6,721,446 | B1 * | 4/2004 | Wilensky et al. ........... 382/162 |
| 2004/0042662 | A1 * | 3/2004 | Wilensky et al. ........... 382/194 |

OTHER PUBLICATIONS

Foley, et al., "Fundamentals of Interactive Computer Graphics", pp. 446-449, Addison-Wesley Systems Programming Serial, 1982.

Smith, et al. "Blue Screen Matting", pp. 259-268, Computer Graphics Proceedings, Annual Conference Series, 1996.

Ruzon, et al. "Alpha Estimation in Natural Images", pp. 18-25, IEEE Conference on Computer Vision and Pattern Recognition 2000, vol. 1, Jun. 2000.

* cited by examiner

IMAGE EXTRACTION FROM COMPLEX SCENES IN DIGITAL VIDEO

TECHNICAL FIELD

The present invention relates generally to computing systems, and more particularly to methods and systems for masking and extracting an object from a complex scene in a digital video.

BACKGROUND

A common task in the manipulation of digital images is to extract one or more foreground objects from a background scene. There are a number of difficulties associated with extracting the object in an accurate way, especially when the background is complex and contains several different colors.

One difficulty is that the object can blend in with the background scene, i.e. a pixel at the edge of an object can have contributions from both the foreground and background and the color of the pixel then becomes a blend of the foreground and background colors. Another difficulty relates to object complexity, i.e. an object border may contain substantial detail that requires tedious effort to identify. Furthermore, there may be combinations of these problems, which for example is the case when the object has hair or fur. The hair or fur shapes are complex, and regions with thin fibers lead to substantial color blending. This makes it difficult to correctly extract the object from the background, since it both has to be masked (i.e. it has to be determined which pixels in the border region belong to the object) and it has to be color decontaminated (i.e. pixels having colors from both the object and the background need to be "cleaned up" so they only contain colors of the object).

Several conventional systems and methods addressing these difficulties have been developed, but all of them have various problems as will be discussed below.

One conventional method for extracting an object from a background in a still image is to use a software product, such as Adobe® Photoshop® 5.5 and 6.0. Photoshop provides an image extract feature that enables highlighting of a fuzzy border of an object in a still image. Photoshop performs the image extraction, producing both an opacity mask and modified colors which remove the background contamination from the object. This method has been described in "METHOD FOR DETERMINING A BORDER IN A COMPLEX SCENE WITH APPLICATIONS TO IMAGE MASKING," application Ser. No. 09/566,632, filed May 8, 2000, which is incorporated herein by reference. The image extract feature can also be applied to a video clip consisting of a series of digital images. However, the image extract feature requires a manual process of highlighting and extracting the object in each frame in the video clip.

Conventional systems that perform image extraction in digital video use a background having a constant, or almost constant, background color (usually blue). Despite the techniques that have been developed in this area, problems still remain with extracting objects whose edges contain substantial detail or have contributions from both the background and the foreground. Blue spill or blue flare (reflection of blue light from the blue screen on the foreground object), backing shadows on the blue screen (shadows of the foreground object on the backing that one wishes to preserve as part of the foreground object), and backing impurities (departures of a supposedly pure blue backing from pure blue) are examples of problems. An analytical approach to overcome some of these problems was presented by A. Ray Smith and J. F. Blinn in "Blue Screen Matting" (Computer Graphics Proceedings, Annual Conference Series, 1996, 259–268) [hereinafter Smith]. Smith proposed a "triangulation solution" where, in addition to a shot of the object against a blue background, another shot of the object is taken against a background having a second color. However, this method cannot be used for moving foreground objects because the method performs a pixel-by-pixel comparison, and the object therefore needs to be in the exact same position in the two shots. Consequently, even though the proposed method may reduce the problems associated with blue screens, it cannot be used when there are moving objects present in a scene with a more realistic background.

It would thus be desirable to have a method similar to the image extract feature in Adobe® Photoshop® that permits accurate object extractions from non-uniform backgrounds, and that also can be applied to a digital video clip without manually having to mark the object to be extracted in every digital image in the video sequence.

SUMMARY

In general, in a first aspect, the invention provides methods and apparatus, including computer program products, implementing and using techniques for masking a foreground portion of a digital image from a background portion of a digital image. The digital image is part of a video comprising a time sequence of digital images, and each image is defined by a plurality of pixels. In this aspect, a first input defining a first border region is received. The first border region includes at least a part of the foreground portion and at least a part of the background portion in a first digital image. A second input defining a second border region is received. The second border region includes at least a part of the foreground portion and at least a part of the background portion in a second digital image. An intermediary border region is interpolated for an image intermediary in time to the first and second digital images. The first, second, and intermediary border regions are used for masking the foreground portion from the background portion in the digital video.

Advantageous implementations can include one or more of the following features. User inputs can define the border regions and interpolating an intermediary border region can be done automatically without user input. When using the first, second, and intermediary border regions for masking the foreground portion from the background portion, for a pixel in a border region a determination can be made whether the pixel includes data that is associated with the foreground portion and the result of the determination can be used to mask the foreground portion from the background portion in the digital video. An intrinsic color value can be estimated for a pixel in the first, second, and intermediary border regions and the estimated intrinsic color value can be used for extracting the foreground portion from the background portion. The border regions may be indicated by generating an inside path located inside a foreground portion; and generating an outside path located outside the foreground portion and enclosing the inside path, wherein pixels between the inside and outside paths belong to a border region. The inside path and the outside path may be vector-based. The border regions can be indicated by generating a single path having a width encompassing that of the border region. The single path may be vector-based and have variable thickness throughout its length.

Masking the foreground portion from the background portion can include masking the foreground portion, and applying Gaussian blur to the portion of the border region. The masked foreground portion and the portion of the border region can further be displayed. Masking the foreground portion and a portion of the border region may alternatively include determining the opacities of the pixels in the portion of the border region that is displayed with the foreground portion and changing the opacities for pixels having opacities greater than a threshold value. Also here the masked foreground portion and the portion of the border region can be displayed.

An input defining a border region for a second foreground portion in the first digital image may also be received. The border region includes at least a part of a second foreground portion and at least a part of the background portion. An input defining a border region for the second foreground portion in the second digital image may also be received. The border region includes at least a part of the second foreground portion and at least a part of the background portion. An intermediary border region for the second foreground portion for an image intermediary to the first and second digital images can be interpolated.

An input defining a first internal border region may be received. The first internal border region can be enclosed by the first border region in a first digital image. An input defining a second internal border region may be received where the second internal border region is enclosed by the second border region in a second digital image. An intermediary internal border region for an image intermediary in time to the first and second digital images can be interpolated. The first, second, and intermediary border regions, and the first internal, second internal, and intermediary internal border regions can then be used for masking the foreground portion from the background portion in the digital video. The first internal border region, the second internal border region, and the intermediary internal border region may comprise at least a part of the foreground portion. The first internal border region, the second internal border region, and the intermediary internal border region may comprise at least a part of the background portion. The first internal border region, the second internal border region, and the intermediary internal border region may comprise at least a part of the foreground portion and at least a part of the background portion. The foreground portion may be an object.

In general, in another aspect, the invention provides methods and apparatus, including computer program products, implementing and using techniques for masking a foreground portion of a digital image from a background portion of a digital image. The digital image is part of a video comprising a time sequence of digital images, and each image is defined by a plurality of pixels. In this aspect, an input defining an initial border region is received. The initial border region includes at least a part of the foreground portion and at least a part of the background portion in an initial digital image. A border region is automatically generated for another digital image in the time sequence based on the initial border region, and the initial and automatically generated border regions are used for masking the foreground portion from the background portion in the digital video.

Advantageous implementations of this second aspect of the invention can include one or more of the features mentioned above for the first aspect of the invention, as well as one or more of the following features. An input defining an initial border region can be received for a second foreground portion, the initial border region including at least a part of a second foreground portion and at least a part of the background portion in the digital image with the first foreground portion. A border region can be automatically generated for the second foreground portion in another image in the time sequence based on the initial border region for the second foreground portion, and the initial and automatically generated border regions can be used for masking the second foreground portion from the background portion in the digital video.

An input defining an initial internal border region can be received. The initial internal border region can be enclosed by the initial border region in a first digital image. An internal border region for another image in the time sequence can be automatically generated based on the initial internal border region, and the initial internal and the automatically generated internal border regions can be used for masking the foreground portion from the background portion in the digital video.

Automatically generating a border region for another digital image can include identifying an edge path in the initial border region, the edge path indicating edges of the foreground portion in the initial digital image; identifying an edge path in an automatically generated border region, the edge path indicating edges of the foreground portion in the another digital image; determining an edge path transformation between the initial digital image and the another digital image; and applying the edge path transformation to the inside path and the outside path in the initial digital image in order to generate a border region in the another digital image. The edge path can be identified using a snake algorithm operating on a previously identified edge path. Identifying an edge path in the initial border region can include finding points in the border region that have image gradient values exceeding a threshold value. An image gradient value may be calculated for each color channel in the initial border region.

Identifying an edge path in the initial border region may include copying the inside path and the outside path; moving the copies of the inside path and the outside path towards each other and towards edges of the foreground portion using a snake algorithm; and identifying the edge path as the path where copy of the inside path and the copy of the outside path converge into one path. Determining the edge path transformation may include determining a set of local edge path transformations, the set of local edge path transformations together forming the edge path transformation. The local edge path transformations can be determined for each point in the edge path by determining a translation, a rotation, and a scaling for each local edge path transformation in the set of local edge path transformations.

Applying the edge path transformation to the inside and outside path may include applying a set of local transformations to each point in the inside path and to each point in the outside path, the set of local transformations forming the edge path transformation by applying a translation, a rotation, and a scaling as each local transformation of the inside path and the outside path.

In general, in yet another aspect, the invention provides methods and apparatus, including computer program products, implementing and using techniques for masking an object from a background in a digital video. The digital video comprises a time sequence of digital images, and each image is defined by a plurality of pixels. In this aspect, a first user input defining a first border region is received. The first border region includes at least a part of the object and at least a part of the background in a first digital image. A second user input defining a second border region is received, the second border region including at least a part of the object and at least a part of the background portion in a second digital image. An intermediary border region is interpolated for an image intermediary in time to the first and second digital images. The first, second, and intermediary border regions are used for masking the object from the background in the digital video. The first, second, and intermediary border regions are used for extracting the object from the background in the digital video and the masked and extracted object are placed against a new background in another digital video.

The invention can be implemented to realize one or more of the following advantages. Fuzzy or hairy objects can easily be extracted from complex backgrounds in a digital video. The extracted object can be inserted in a new background scene. A blue screen background is not necessary for achieving a successful extraction of the object. The object can be automatically or semi-automatically extracted.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
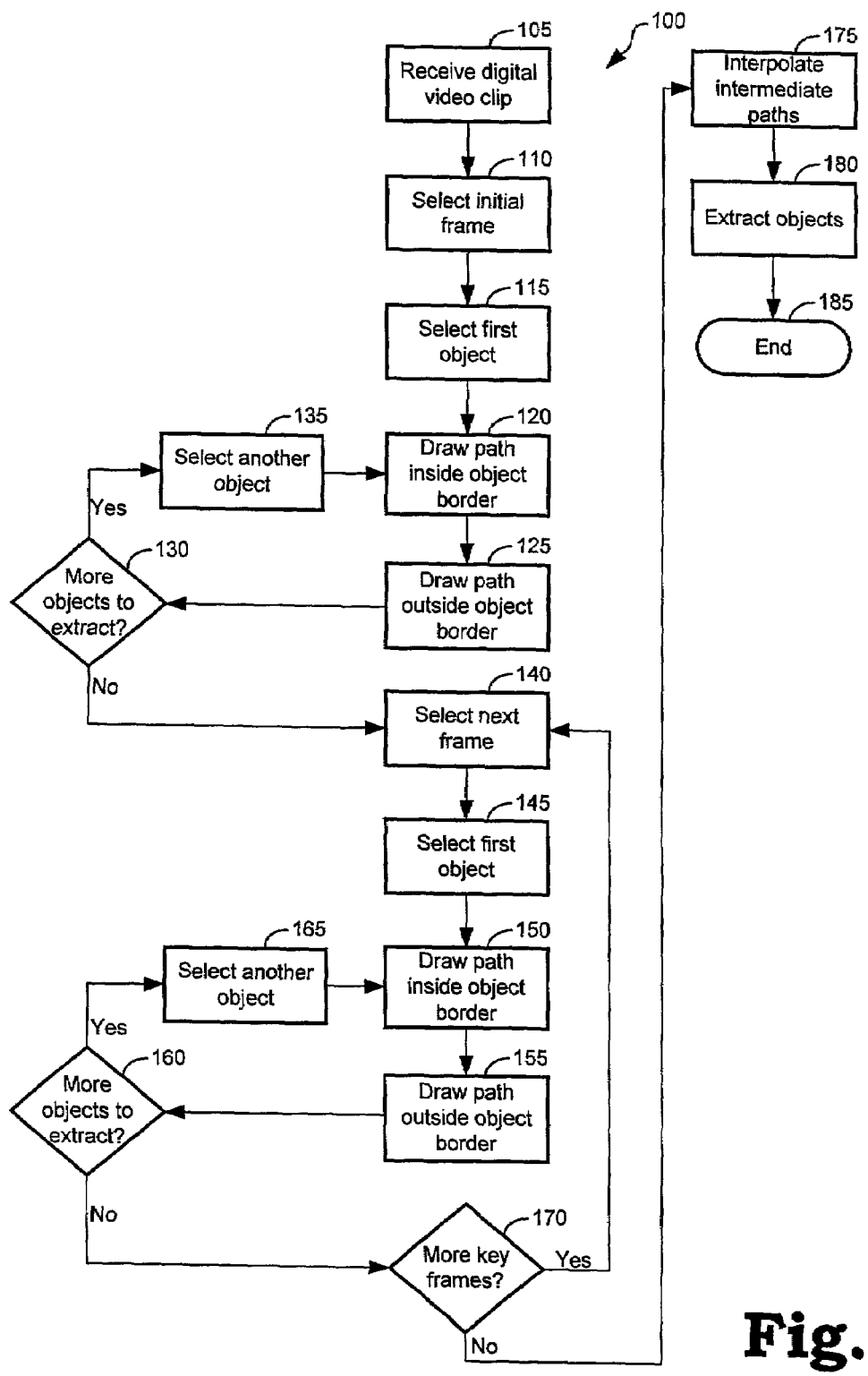
FIG. 1 is a flowchart for selecting and extracting an object from a digital video clip using an inside path and an outside path.

FIG. 1 shows a process 100 for extracting foreground portion from a background portion in a digital video. The process can be applied to any foreground portion a user wishes to extract from the background. In a preferred implementation of the invention the foreground portion represents an object. By way of example, the foreground portion will be referred to as an object in the following description, but this should in no way be interpreted as a limitation of the appended claims. The object, or foreground portion, to be extracted from the background may be of any type, may be stationary or moving, and may have a varying shape and appearance. The process works equally well on any foreground portion or object. The digital video includes a time sequence of digital images to be displayed at a certain rate. Digital video can have several different formats, the most common ones being AVI, MPEG, and MOV. The process can be executed by one or more processors, each executing instructions accessed from a local and/or remote memory. The processors may also be coupled to various input/output devices such as, for example, a display, a keyboard, or a mouse to enable a user to control the input and evaluate the result of the process. The processors may also be coupled to an input/output interface that receives and transmits data over a communication link. Such communication links include, by way of example, a serial link, a local area network, wireless link, and parallel link.

Figure 3A:
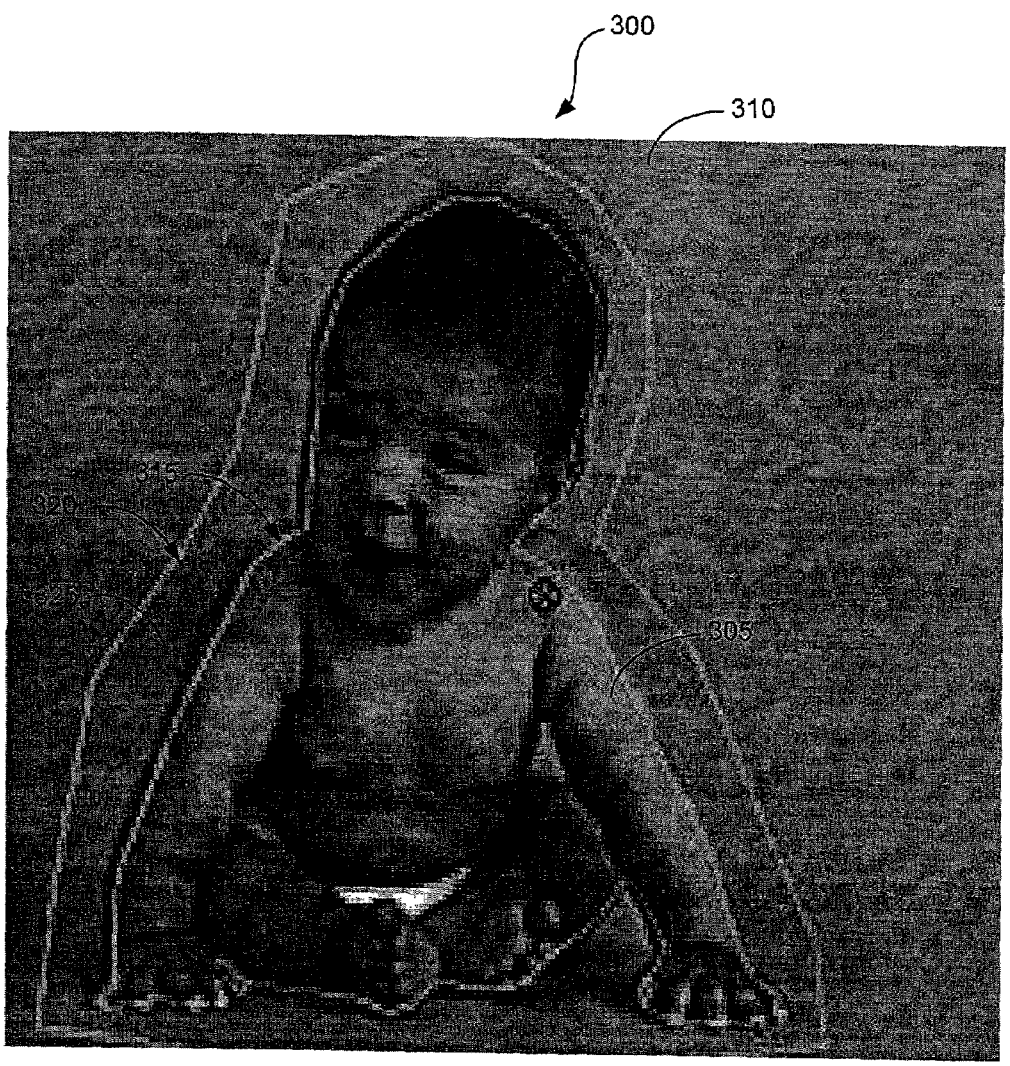
FIG. 3A is a first digital image showing an object in a first position against a first background.

The process 100 begins at step 105 with the receipt of a digital video clip from which a user wishes to extract an object. This digital video clip can be received through any of the various input/output devices or communication links. In step 110 the process receives a user selection of an initial keyframe. The initial keyframe is a digital image corresponding to an instance in time at which the user wishes to start extracting the object from the video clip. One example of a keyframe 300 is shown in FIG. 3A including an object 305 set on a background 310. In step 115 the process receives an input from a user indicating an object that he or she would like to extract from the background, and in step 120 the process receives a path drawn by the user inside the border of the object. When drawing the path inside the border of the object, the user can generally follow the outline of the object.

Border refers to the region of the image in which the foreground object meets the background region. The border may be many pixels wide or may be as small as only a single pixel wide and includes pixels having blended data, that is, data associated with the object and data associated with the background. For example a red object on a blue background may result in a border having pixels that are blue, red, and different shades of purple. In many cases a user finds it difficult to trace the border of the object. One example of this is when the object has a fuzzy edge with hair or fur. The process therefore lets the user create a wider border region enclosing the border, as will be seen below. After receiving the path inside the border of the object, the process also receives a path drawn by the user outside the border, step 125. The outside path also only needs to generally follow the border. The area between the inside path and the outside path constitutes the border region, which encloses the border. A more detailed description of how the border region is used will follow. The inside and outside paths can be of the form of Bezier curves. However, other types of vector-based paths could also be used.

Figure 6:
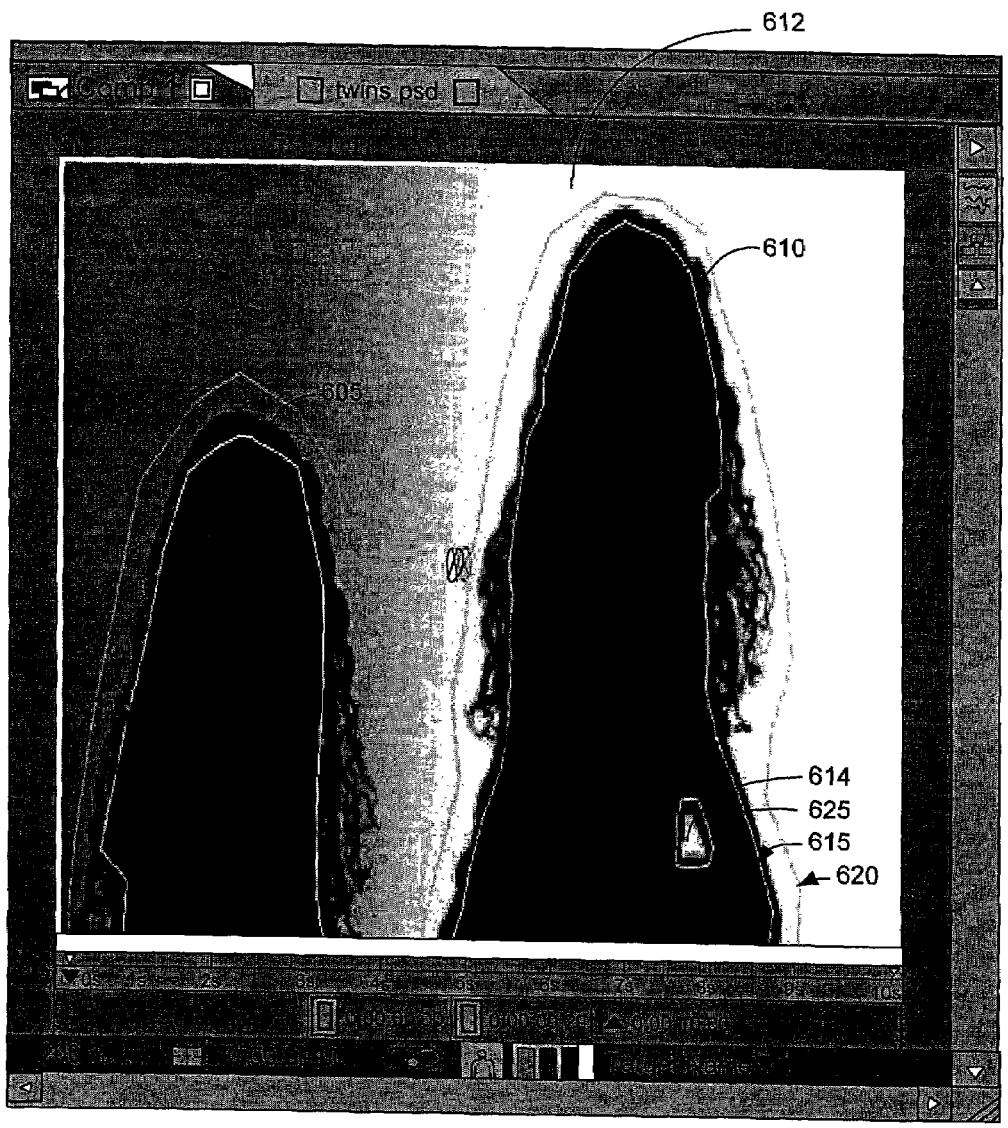
FIG. 6 is a digital image showing an object including a part of the background.

Next, the process waits to see whether the user is interested in masking any other objects from the background, step 130. FIG. 3A only contains one object 305, but FIG. 6 shows an example of where there are two objects 605 and 610 to be extracted. If the user wishes to select another object, the process allows the user to select a new object, step 135. The process then receives user inputs indicating an inside path and an outside path around the new object, steps 120 and 125. After all the objects have been selected, the process moves on to step 140 where the process receives a user selection of another keyframe.

Figure 3B:
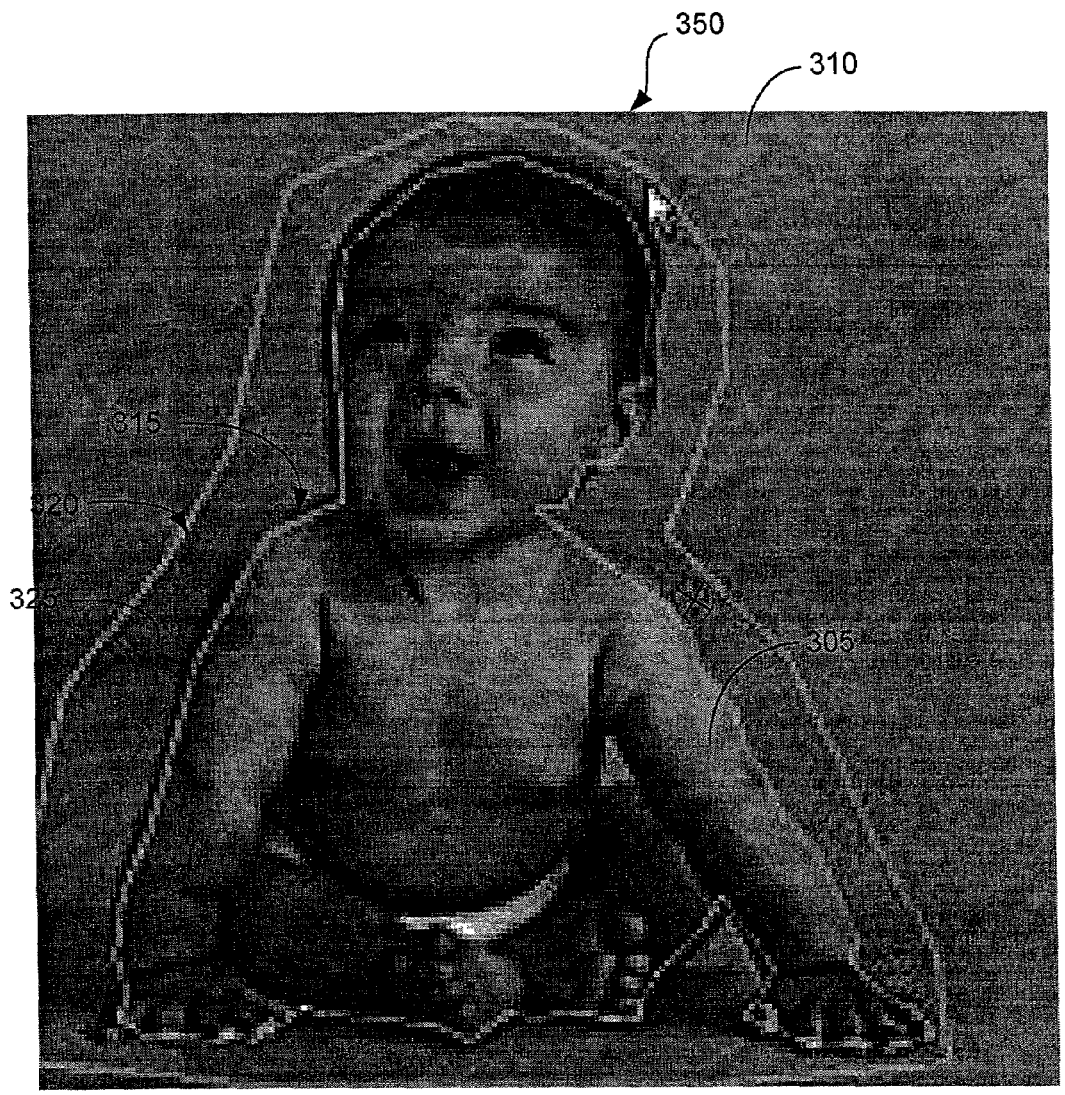
FIG. 3B is a second digital image showing the object in a second position against the first background.

In the new keyframe 350, shown in FIG. 3B, the process performs the same steps as in the initial keyframe. The process receives an input from a user identifying the first object, step 145, an inside path, step 150, and an outside path, step 155, defining the border region. The object may have changed positions between the initial keyframe and the new keyframe, and the inside and outside paths may consequently have a different shape and location, leading to a changed border region. After receiving the paths, the process waits for an input from the user indicating if there are any more objects in the image to be extracted from the background, step 160, and if so a new object is selected for processing, step 165, and paths around the new object are received.

When a border region has been created for each object of interest in the new keyframe, the process waits for a user input identifying any other keyframes, step 170. If so, the process goes back and continues from step 140 where it receives another keyframe. The number of keyframes that are selected may vary depending on the type of motion the object performs, and how exact the user would like the interpolation between the images to be, as will be described below.

After the user has marked the border regions in all the keyframes of interest, the process continues by interpolating intermediate paths for the images located in time between the keyframes received from the user, step 175. The interpolation of the intermediate paths can be done in a number of conventional ways. Examples of interpolation processes can be found in "Adobe After Effects Version 3.0 User Guide for use with Apple Macintosh Computers", 1995, and in the commonly owned U.S. Pat. No. 5,929,867, entitled "FLOATING KEYFRAMES," which are both incorporated herein by reference. Generally, in a movie system two functions, Q and S, are used to control changes in layer properties over time. Q defines a path through an n-dimensional property space and S defines the motion along the path. The shape of Q and S are controlled by the keyframes. To animate a layer property between two keyframes, the system will construct a path Q between the two property values and a motion control function S between the two time values associated with the respective keyframes. The system then uses path Q and motion control function S to interpolate the value of the layer property for all the frames between the two keyframes.

For example, to achieve motion of a layer across a screen, a user selects a keyframe at a first time, which sets the layer's position property to an initial position. The user then selects a second keyframe at a second time which sets the layer's position property to its next position. When instructed to animate the change, the system calculates the position of the layer at each of the intermediate times and moves the layer to each of those positions, thereby producing motion of the layer from the starting to the ending positions. Users can select any number of keyframes for each property, and interpolation is accomplished in the same manner between each pair of adjacent keyframes.

The principles behind the animation of the position property of a layer are equally applicable to animation of other n-dimensional layer properties such as color, size, mask shape, 3D object shape, 3D object position, and other arbitrary n-dimensional properties. The layer properties that are interpolated in the invention described in this application are the shape of the inside and outside paths, respectively, and their respective location in each frame of the digital video.

Figure 5:
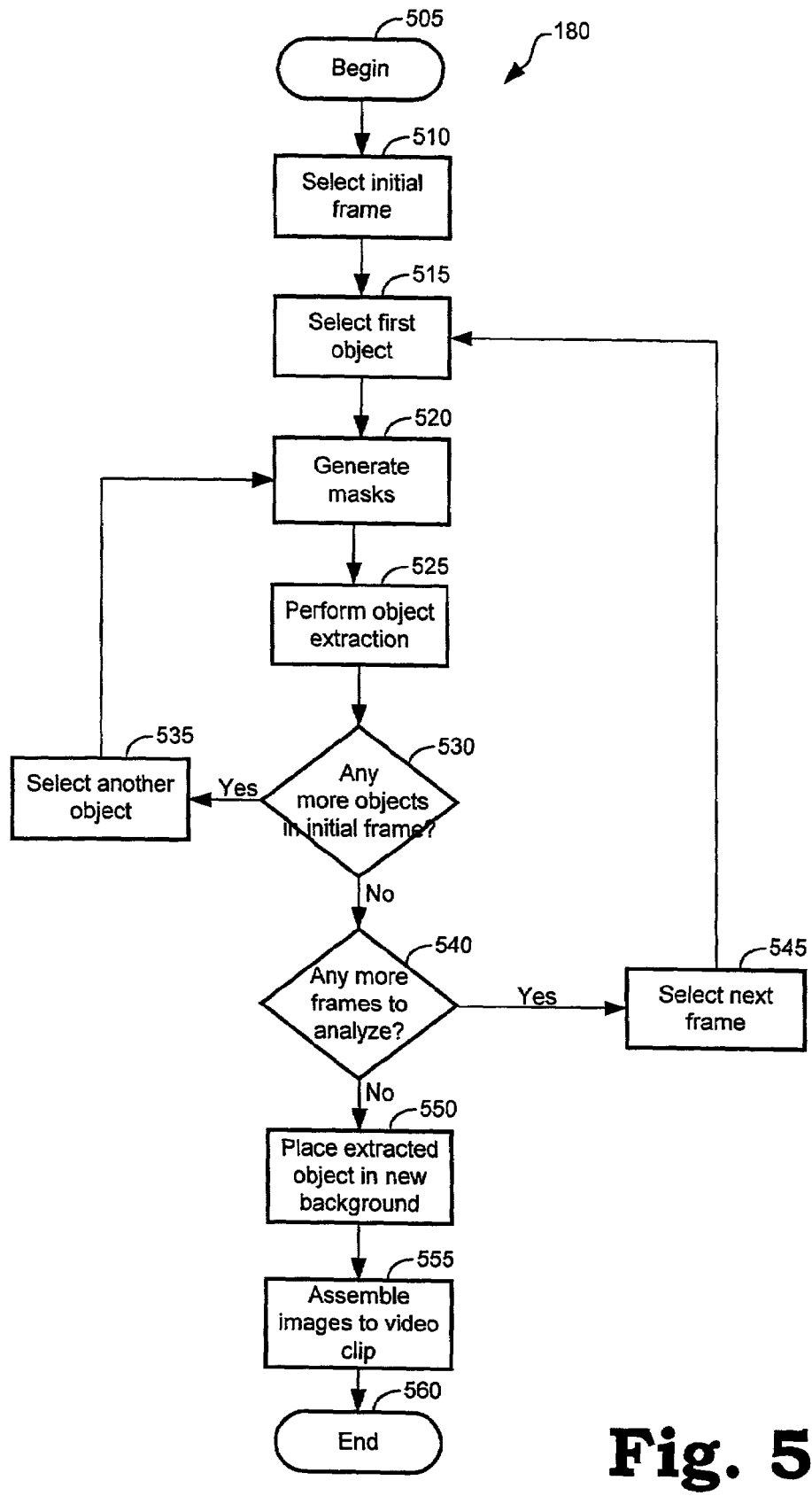
FIG. 5 is a flowchart showing the extracting step of FIG. 1 and FIG. 2, respectively.

After the inside paths and outside paths have been automatically interpolated for each frame between the keyframes, the process extracts each object that has been selected by the user from the background, step 180. The extraction process will now be described in more detail with reference to FIG. 5, in which the process starts at step 505. First, the extraction process selects the initial keyframe, step 510. The extraction process selects the first object, step 515. Based on the vector-based inside and outside paths, raster-based foreground, background and highlight masks are generated, step 520. The three masks are generated in the following manner:

First, the extraction process generates a foreground mask using the inside path. The inside path is sampled at closely spaced points with one, or less than one, pixel separation. For each sample point, the value of the mask is set to 1. After sampling the inside path, an arbitrary point is chosen inside the inside path. The point inside the path can be found by first creating a pixel mask which has values of 0 everywhere except for pixels which are crossed by the path; those will be assigned values of 1. Next a pixel with mask value of 1 is chosen. That pixel's nearest neighbors which have a mask value of 0 are then considered and any one of them chosen as the inside point if the pixel has the following property: a line drawn from the point to the edge of the image makes an odd number of 0 to 1 or 1 to 0 transitions in the mask values of the pixels it encounters. After choosing the inside point, the extraction process creates a foreground mask by first setting the mask values of all pixels which lie along the path to a value of 0.5 and all other pixels to a value of 0. Then a flood fill operation, starting at the chosen inside point, is performed which fills all 0-valued pixels with the value 1 and stops the flood fill expansion when pixels with values of 0.5 are encountered. Finally, all 0.5-valued pixels are changed to have values of 1. The technique of flood filling is well known in the art, and is described in James D. Foley and Andries van Dam, "Fundamentals of Interactive Computer Graphics" (Addison-Wesley Publishing Company, 1982, pages 446–449). Second, the extraction process produces a background mask in a similar way, but by using the outside path instead of the inside path, and choosing an arbitrary point outside the outside path as a starting point for the flood filling. Finally, the extraction process generates a highlight mask corresponding to the border region from the foreground and background masks. A value of 1 is assigned to a point in the highlight mask if the corresponding values of the foreground and background masks are 0 at that point. If any or both of the foreground and background mask values, respectively, equals 1 at the point in question, the value of the highlight mask is set to 0. The highlight mask thus defines a border region.

An alternate method of generating the masks in step 520 treats all the objects in the image together as one single object. For this approach, all the foreground-designated paths are combined to produce a foreground mask and all the background-designated paths are combined to produce a background mask. The combination consists of calculating the mask associated with each path, as above, and applying a logical XOR operation to each pixel in order to combine the individual masks into one combined mask. If the combined background mask is designated as B and the individual background masks as $b_a$, where a=1, 2, ... $N_b$, the number of background paths, then the operation can be represented as (Please note that the notation below indicates operations to be performed on each pixel in a mask. For example, the equation B=0 implies "set the value of each pixel in mask B to 0."):

$B=0$ repeat for each b=1, 2, ... $N_b$ $c_a = 1 - b_a$ (complement of $b_a$)

B=$c_a$ XOR B

Taking the complement reduces the background mask:

$B = 1 - B$, where c XOR d is equal to 0 if both c and d are equal to 0 or both are equal to 1, and c XOR d is equal to 1 otherwise for any mask pixel values c and d, which can take on possible values of 0 or 1.

A similar, but slightly different, operation is carried out to produce the combined foreground mask F from the individual masks $f_a$, a=1, 2, . . . $N_f$, the number of foreground paths.

F=0 (set each pixel in the mask to 0)
repeat for each a=1, 2, . . . $N_f$
F=$f_a$ XOR F
set B to 0 if the corresponding pixel in F is being set to 1

The highlight mask is generated as previously described above by setting to 1 all pixels which have neither F nor B pixels values set to 1.

Using the procedure just described, the whole image is treated as a single entity which may consist of multiple pieces and the extraction process, as described below, produces a complete extraction in a single step.

When the highlight mask, has been determined, the extraction process continues at step 525, in which an object extraction is performed. One example of an object extraction process is described in the commonly owned U.S. patent application "METHOD FOR DETERMINING A BORDER IN A COMPLEX SCENE WITH APPLICATIONS TO IMAGE MASKING." The result of the object extraction process is a color-decontaminated image of the object consisting of new 'intrinsic' foreground color values and an opacity channel (alpha channel), which designates the degree to which each pixel belongs to the foreground object. For an eight-bit mask, a value of 255 represents total membership in the foreground, a value of 0 represents total membership in the background, and intermediate values represent intermediate memberships in the foreground and background.

Figure 4A:
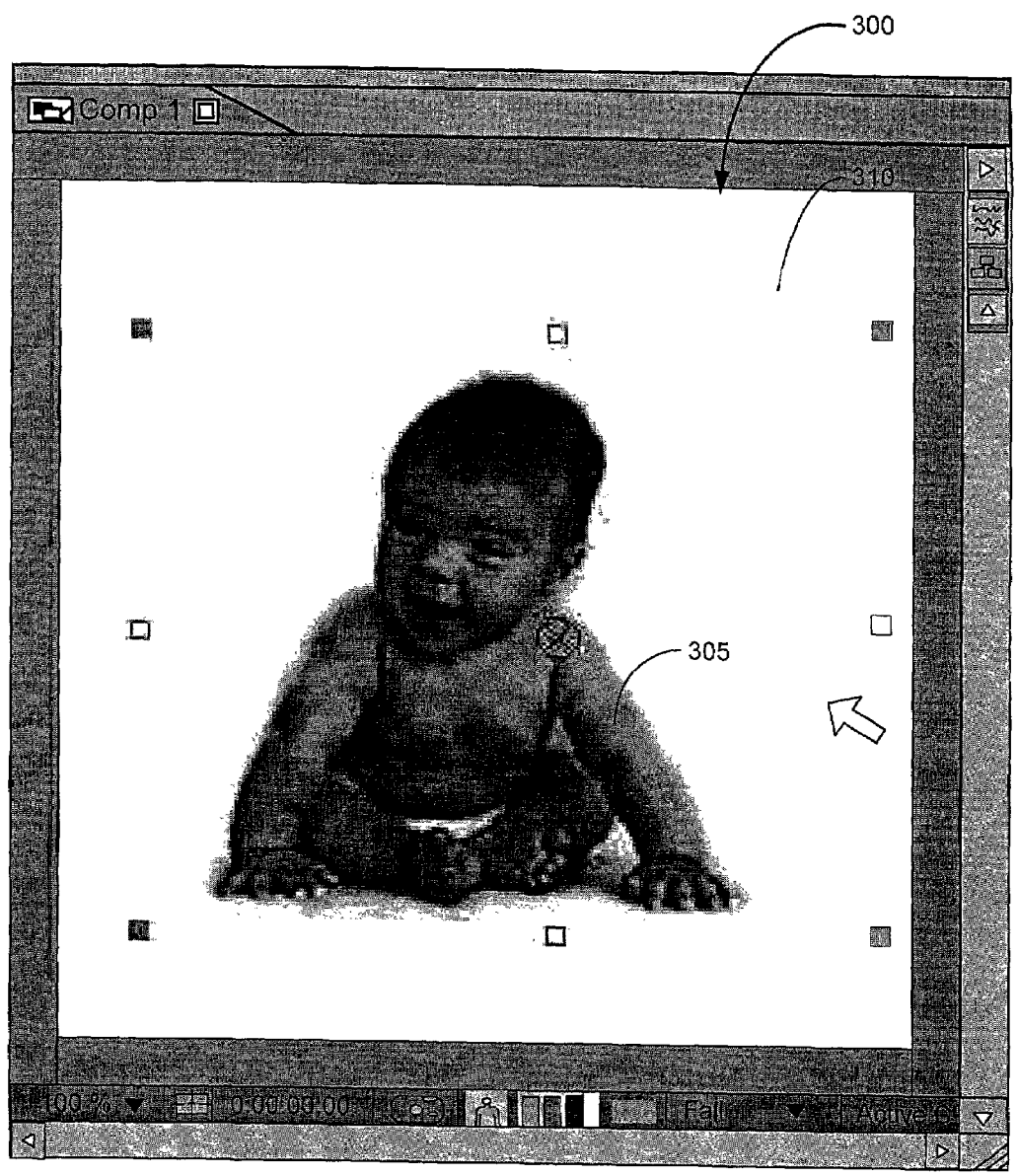
FIG. 4A is a first digital image showing the object in FIG. 3A placed against a new background.
Figure 4B:
FIG. 4B is a second digital image showing the object in FIG. 3B placed against a new background.

The extraction process then checks to see if the user has defined any more objects to be extracted from the initial keyframe, step 530. If so, then the process selects the next object, step 535, and performs steps 520–535 for this object. Steps 520–535 are repeated until no more objects remain to be processed, after which the process examines if there are any more frames to be processed, step 540. If more frames remain to be processed, the masking process selects a new frame, step 545, and repeats steps 515–540 for the new frame. When the final frame of the video clip or another stop point in the video clip has been reached, the extraction process places the extracted objects in a new background frame-by-frame, step 550. This can be seen in FIG. 4A and FIG. 4B for the frames shown in FIG. 3A and FIG. 3B, respectively. Finally the images are assembled to a video clip showing the moving object 305 against a new background, step 555. This completes the extraction process 500.

Figure 2:
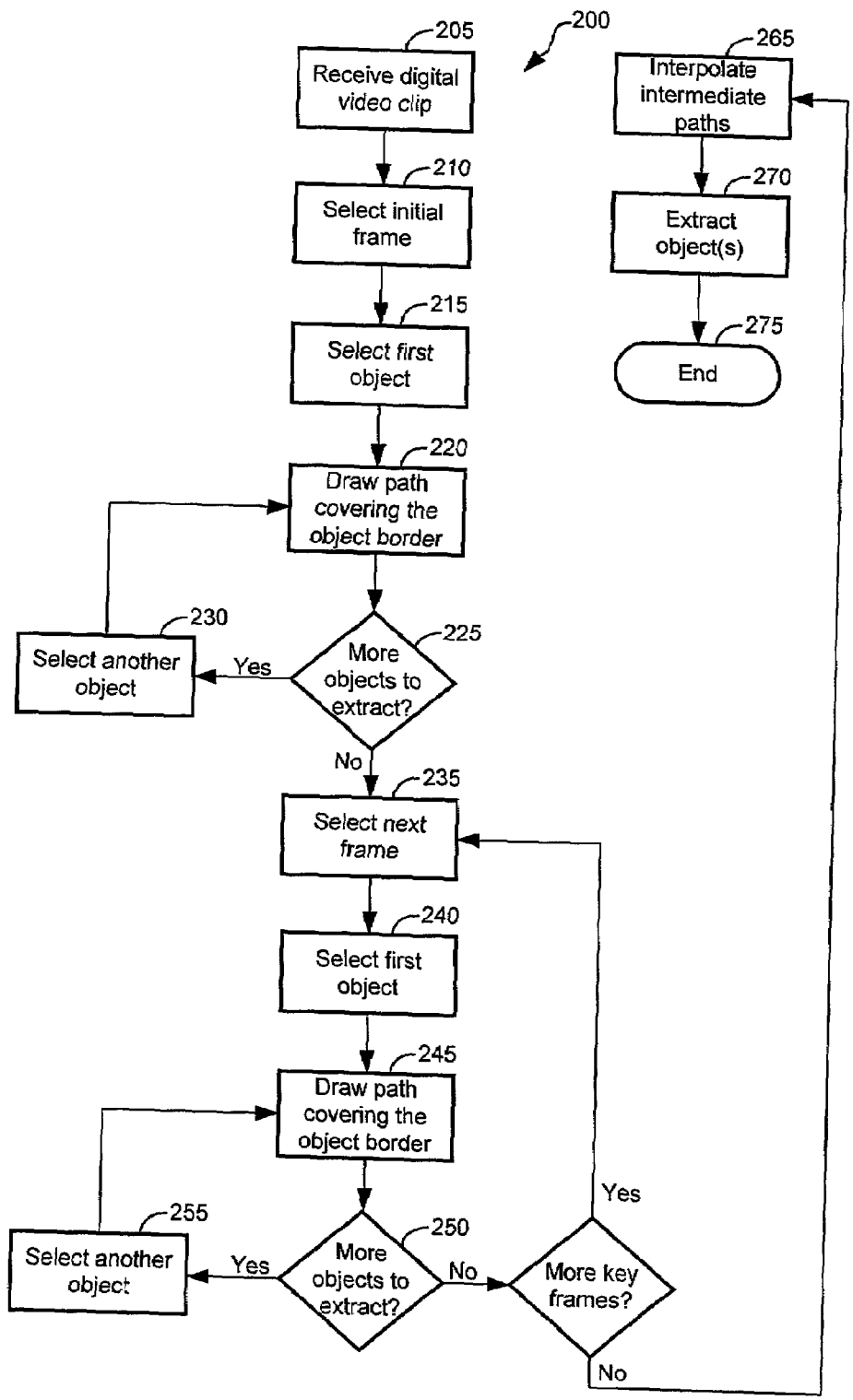
FIG. 2 is a flowchart for selecting and extracting an object from a digital video clip using a single path along the object border.

The extraction process can also be carried out using only one path around the object. This process is very similar to the one described above, and will now be explained with reference to FIG. 2. The process 200 begins at step 205 with receipt of a digital video clip from which a user wishes to extract an object. In step 210 the process receives a user selection of an initial keyframe, followed by a selection of an object he or she is interested in extracting, step 215. However, instead of receiving an inside path and an outside path around the object border, in this implementation, the process only receives one path drawn by the user, step 220. This path has a certain thickness, which is sufficient for covering the border. The path can for example be drawn using a brush tool where the thickness varies depending on the pressure the user applies. The characteristics of these types of brush tools are well known in the art, and will therefore not be described here. By having the option of varying the thickness of the path the user draws around the border, parts with different "fuzziness" can be accounted for. In the example with the baby in FIGS. 3A and 3B, it may for instance be more desirable to draw a thicker path around the head region where the border is hard to define, and a thinner path along the arms, where the border is more easily defined. In the previous implementation the user indicated the border region by drawing an inside and outside path, but in this implementation the border region is instead indicated by the path itself, and may therefore be a more attractive option in many cases. Also here, the path is vector-based and made up by Bezier curves, but other types of vector-based paths could also be used.

Next, the process waits for the user to input whether he or she desires to extract any other objects from the background, step 225. If more objects are to be extracted, the process proceeds by receiving an indication of the next object selected by the user, step 230, and receiving a single path around the second object, step 220. When all the objects have been selected, the process continues at step 235 in which the process allows the user to select another keyframe. For this new keyframe the process performs the same steps as in the initial keyframe. The process receives a selection of the first object, step 240, and a path covering the border of the object, step 245. After drawing the paths, the process waits for a user input indicating whether or not there are any more objects in the image to be extracted from the background, step 250. If so new objects are identified, step 255 and paths are drawn around them.

When a border region has been created around each object of interest in the new keyframe, the process receives an input from the user indicating whether he or she wishes to create border regions for the objects in any other keyframes, step 260. If so, the process goes back to step 235 where a new keyframe is selected. The number of keyframes may vary depending on the type of motion the object performs, and how exact the interpolation between the images should be, as will be described below.

After the user has marked the border regions in all the keyframes of interest, the process continues by interpolating intermediate paths for the images located in time between the keyframes selected by the user, step 265. After a path around each selected object has been automatically interpolated for each intermediate frame, each object that has been selected by the user is masked from the background, step 270. The object is extracted as described above except that step 520 in which the background, foreground, and highlight masks were created are carried out in a different way, which will now be explained below. The three masks are generated in the following manner:

First, the masking process generates a foreground mask using the inside edge of the single path. The inside edge of the path is sampled at closely spaced points with one, or less than one, pixel separation. For each sample point, the value of the mask is set to 1. After sampling the inside edge of the path, the masking process chooses an arbitrary point on the inside of the path. The arbitrary point can be chosen in a similar manner to the method described above for both the inside and the outside paths. After choosing the inside point, the masking process creates a foreground mask by flood-filling the mask with values of 1, starting at the chosen point. Second, the masking process produces a background mask in a similar way, but by using the outside edge of the path instead of the inside edge of the path, and choosing an arbitrary point outside the outside edge of the path as a starting point for the flood-filling. Finally the masking process generates a highlight mask by assigning a value of 1 to the highlight mask and assigning a value of 0 to both foreground and background masks for each pixel which lies within the designated radius R from each point on the single path. When the highlight mask has been determined, the masking process performs steps 525–560 as described above, and the completion of the masking process also completes the overall process, shown by step 275 in FIG. 2.

In some cases a background object may be present inside a foreground object. For example, as can be seen in FIG. 6, woman on the right has an area 614 under her arm that is not a part of the foreground, but a part of the background 612. If the user wishes to separate this background part 614 from the foreground, he or she can mark this area by drawing a path 625 enclosing the background part 614. The path enclosing the background part 614 lies completely within the object. When the masking process generates the foreground, background and highlight masks, everything inside the path enclosing the background part 614 is part of the highlight mask, and will be treated accordingly during the object extraction and masking. Of course, the border region or highlight region around the background part 614 may alternatively be indicated by creating a border region with an inside path and an outside path or by drawing a single path having a width that covers the border, as has been described above. Here, where the background part lies within the object, the border region is referred to as an internal border region. Creating an internal border region using an inside and an outside path is especially useful when a large part of the foreground object belongs to the background, and leads to a faster processing time for the border determination in the highlight region.

Figure 7:
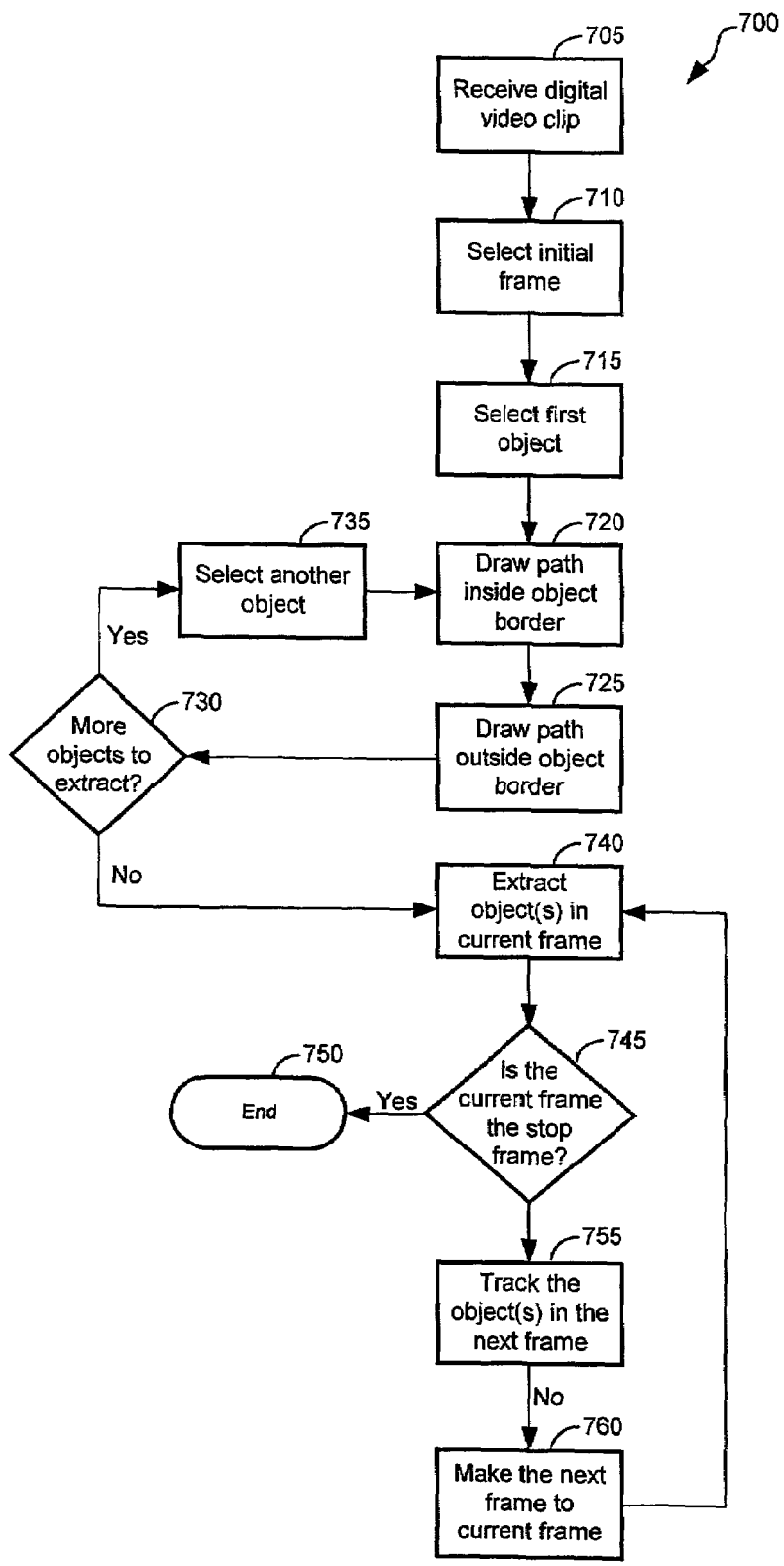
FIG. 7 is a flowchart for selecting and extracting an object using only one keyframe.

An alternative implementation of the invention will now be described with reference to FIG. 7. In this implementation one or more objects can be tracked automatically by selecting the object(s) in one initial keyframe. Steps 705–735 shown in FIG. 7 are identical to the process described in relation to FIG. 1. After the process has received user indications of all the objects to be masked, the process continues with step 740 and masks the object in the current frame. The process then checks if the current frame is the stop frame, step 745. The stop frame can be the last frame in the video clip, or can be selected by the user. If the current frame is the stop frame, the process ends in step 750. Otherwise the process continues to step 755 in which the selected object is automatically tracked in the next frame. The tracking process will be described in greater detail below. The next frame is made current, step 760, and the process continues with extracting the object in the current frame, step 740, and finally ends when the object has been tracked and extracted from all the frames. In the process shown in FIG. 7 an inside path and an outside path is used. Alternatively, these steps can be carried out using one path covering the object border instead of the inside and outside paths, as has been described above in relation to FIG. 2.

The automatic tracking step 755 will now be described, but first a set of variables need to be introduced. For the purposes of describing the automatic tracking step 755, it is assumed that only one object has been selected in an initial frame occurring at a time t, using an inside path P1(t) and an outside path P2(t). A person skilled in the art will understand how to generalize the process to more than one object from the following description. If more than one object is selected, the method is applied repeatedly to each object. Each path consists of a set of vertices with specified coordinates. For example, $P_1(t)=\{v_{11}(t), v_{12}(t), v_{13}(t), \ldots v_{1M1}(t)\}$ consists of $M1$ vertices and $P2(t)=\{v_{21}(t), v_{22}(t), v_{23}(t), \ldots v_{2M2}(t)\}$ consists of $M2$ vertices, where $v_{ij}(t)=(X_{ij}(t), y_{ij}(t))$ is the two-dimensional vertex point at a time $t$ The vertex point can be of a higher dimension if required by the application. The inside and outside paths are formed by connecting their respective vertices with straight lines or by more complex curves, such as for example a cubic Bezier curve. In order to generate points that are spaced close enough together the curves are first sampled to generate a potentially denser set of points, $r_{ij}(t)$. The sampling is carried out using standard sampling methods to yield the following representations of the input and output paths as a set of points:

$P_1(t)=\{r_{11}(t), r_{12}(t), r_{13}(t), \ldots r_{1N1}(t)\}$ consists of $N1$ points and $P_2(t)=\{r_{21}(t), r_{22}(t), r_{23}(t), \ldots r_{2N2}(t)\}$ consists of $N2$ vertices, where $r_{ij}(t)=(X_{ij}(t), y_{ij}(t))$ is the sample point at time $t$ The number of sample points chosen depends on the level of the detail desired. At one extreme N1=M1 and N2=M2. This is the case when only the vertices are chosen. Another extreme is when the sampling points are chosen so densely that the distance between any adjacent sample points is less than the spacing between pixels.

Figure 8:
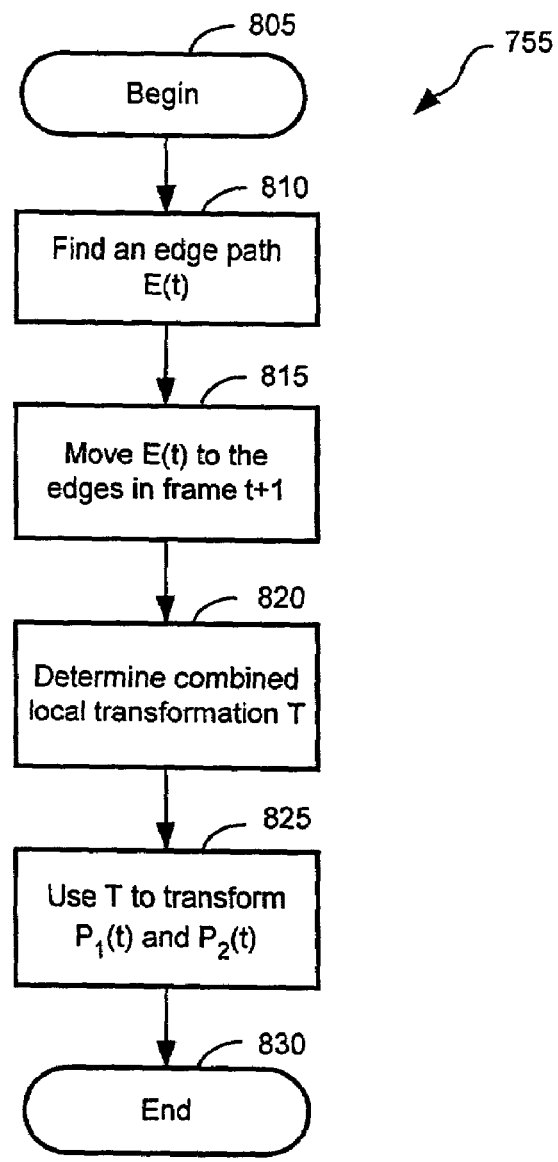
FIG. 8 is a flowchart detailing the tracking step of FIG. 7.

Having defined these variables, the automatic tracking process in step 755 will now be described with reference to FIG. 8. First a brief overview of the whole process will be presented. The automatic tracking process begins in step 805. In step 810, the tracking process identifies an edge path E(t) that has strong edges in the border region between $P_1(t)$ and $P_2(t)$ in the initial frame occurring at time t. When the tracking process has identified the edge path E(t) in step 810 the tracking process moves on to step 815 in which the edge path E(t) moves towards the edges in the next frame occurring at time t+1. After moving the edge path towards the edges in the following frame, a combined local transformation T is determined which brings E(t) to E(t+1), that is, E(t+1)=T E(t), step 820. The transformation T is then used to transform $P_1(t)$ and $P_2(t)$, step 825, according to $P_1(t+1)$ =T $P_1(t)$ and $P_2(t+1)$=T $P_2(t)$. By applying the transformation T to paths $P_1(t)$ and $P_2(t)$, they transform in a way that mimics the transformations that take place in the image edges that lie in the border region between the two paths. This completes the automatic tracking process and the object may be extracted from the frame, as has been described previously. Steps 810–825 will now be described in greater detail.

Step 810: Finding an Edge Path

The edge path E(t) can be found by using either of two methods. Method A has the advantage that it is simpler and faster to perform, and it captures all edges in the border region. However, in situations where the contribution from the background is a large fraction of the edges in the border region, Method B often produces better tracking of the object.

Method A

The goal of Method A is to find points in the border region, that is, between $P_1(t)$ and $P_2(t)$, that have edge values or image gradient values that are larger than a predetermined threshold value, $G_0$. The expressions edge values and image gradient are used interchangeably here and refer to color intensity value changes between the pixel being studied and its neighboring pixels. An analytical expression for the gradient values will be given below. Just like in the implementations of the invention described above, a border region mask or highlight mask H is generated which has a value of 1 for all pixels between $P_1(t)$ and $P_2(t)$ in the image frame, and a value of 0 otherwise. Following the generation of the highlight mask H, an image gradient $G(x,y)$ is calculated for each pixel having a value of 1. One way of calculating the image gradient $G(x,y)$ is given by:

$G(x, y) = \sqrt{I_x^2 + I_y^2}$, where $I_x = I(x+1, y-1) - I(x-1, y-1) + 2[I(x+1, y) - I(x-1, y)] + I(x+1, y+1) - I(x-1, y+1)$ $I_y = I(x-1, y+1) - I(x-1, y-1) + 2[I(x, y+1) - I(x, y-1)] + I(x+1, y+1) - I(x+1, y-1)$ $I(x,y)$ is the image intensity for a given color channel in the image.

The gradients, calculated for each color channel, can be combined. For example, if the image is an RGB color image consisting of red, green, and blue color channels, the gradient $G(x,y)$ can be calculated as:

$G(x,y) = \sqrt{G_r(x,y)^2 + G_b(x,y)^2 + G_g(x,y)^2}$, where $G_r$ is the gradient of the red channel
$G_b$ is the gradient of the blue channel
$G_g$ is the gradient of the green channel If the pixel has a gradient value greater than $G_0$, then it is added to the list of points comprising E(t). A typical value of threshold $G_0$ is 100 for eight-bit images in which the pixel intensity values range from 0 to 255. The edge path E(t) will then consist of all points between $P_1(t)$ and $P_2(t)$ having a gradient larger than $G_0$. The points are not guaranteed to be adjacent to each other, but that is not necessary for performing the remaining steps, as will be seen below.

Method B

This method is more complex than Method A, but guarantees that all the points in the edge path E(t) will be adjacent to each other. This method also produces the single best continuous edge which lies between $P_1(t)$ and $P_2(t)$, as opposed to Method A, which produces edge points from any strong edges in the border region.

This is achieved using a novel application of a standard snake technique. Snake techniques are well known in the art. The novel application that is used in this implementation of the invention is also known as an active contour technique, and is described in M. Kass, A. Witkin, and D. Terzopoulos, "Snakes: Active Contour, Models," (International Journal of Computer Vision, vol. 1, pages 321–331, 1998) [hereinafter Kass].

First, a copy of each path is made $P_1'(t) = P_1(t)$ and $P_2'(t) = P_2(t)$. Each point in the path $P_1'(t)$ is moved according to a set of forces which resist changes from the initial position or bending of the path and is pulled towards the path $P_2'(t)$ and thereby also towards the edge of the object. Moving the different points in $P_1'(t)$ is accomplished using methods similar to those described in Steve R. Gunn and Mark S. Nixon, "A Robust Snake Implementation; A Dual Active Contour" (IEEE Transactions on Pattern Analysis and Machine Intelligence, vol. 19, no. 1, January 1997). $P_2'(t)$ is moved in a similar way towards $P_1'(t)$, and thereby also towards the edge of the object. In this way $P_1'(t)$ and $P_2'(t)$ will eventually converge to a path E(t) which will tend to follow strong edges in the border region between $P_1(t)$ and $P_2(t)$.

An edge force field $G(x,y)$ is created by calculating the gradient at each pixel location (x, y) in the image frame in the same manner as the image gradient was calculated in Method A above. This field is blurred or diffused to allow the influence of edges to extend over a larger range. A typical implementation of the blurring involves the application of a standard Gaussian blur with a radius of 10 pixels to $G(x,y)$. The user of the application can control the blur radius. The negative of the resultant blurred gradient will be designated $V_e(x,y)$ and is the edge-based potential energy which will drive the paths towards strong edges. An alternative method for finding $V_e(x,y)$ is to threshold $G(x,y)$, assigning a value of 1 to those pixels having values of $G(x,y)$ greater than $G_0$ and a value of 0 to all others. Then a distance transform calculation is performed to produce the field $V_e(x,y)$ which is 0 at the above-threshold points and increases linearly with increasing distance from those points. Distance transform calculations of this type have been described in Per-Erik Danielsson, "Euclidean Distance Mapping" (Computer Graphics and Image Processing, vol. 14, pages 227–248, 1980).

Using another application of the distance transform applied to those points along path $P_2'(t)$, a potential field $V_2(x,y)$ is found that has values of 0 for points along the path and increasing values away from those points. A similar potential field $V_1(x,y)$ is also calculated based on points in path $P_1'(t)$.

Having calculated the three potential fields $V_e(x,y)$, $V_1(x,y)$, and $V_2(x,y)$ at time t the points on paths $P_1'(t)$ and $P_2'(t)$ are moved to minimize a weighted sum of these three potential energies while also minimizing the distortion of the curves. The weighted sum is $V_{external}(x,y) = c_e V_e(x,y) + c_1 V_1(x,y) + c_2 V_2(x,y)$, where $c_e$, $c_1$ and $c_2$ are weighting coefficients. When the distance transform method is used, a typical value for each of the weighting coefficients is 1.0. When moving path points in the path $P_2'(t)$, $c_2$ is set to 0 and when moving path points in $P_1'(t)$, $c_1$ is set to 0.

Multiple iterations, typically 10, are carried out when moving the paths. For each iteration, all points in path $P_1'(t)$ and all points in path $P_2'(t)$ are moved. Let $v_x$ and $v_y$ be variables (velocities), which have initial values of 0 and let (x,y) be initialized to the values of the path coordinates; for example for point 3 in path 1, $x = x_{13}(t)$, $y = y_{13}(t)$. Then each point is moved as:

$v_x = v_x + dt^* F_x$ $v_y = v_y + dt^* F_y$ $x = x + dt^* v_x$ $y = y + dt^* v_y$ dt is typically 0,2

$F_x = -V(x+1, y) + V(x-1, y)$ $F_y = -V(x, y+1) + V(x, y-1)$

V(x,y) is a potential energy that consists of the external and internal energies:

$$V(x,y) = V_{external}(x,y) + V_{internal}(x,y)$$

The internal energy minimizes the distortions of the curves from the original curves. An example of the internal energy for point 3, for example, is given by:

$$V_{internal}(x_3, y_3) = k[(x_3 - x_2 - x_{13}(t) + x_{12}(t))^2 + (y_3 - y_2 - y_{13}(t) + y_{12}(t))^2 + (x_3 - x_4 - x_{13}(t) + x_{14}(t))^2 + (y_3 - y_4 - y_{13}(t) + y_{14}(t))^2]$$

where k is a spring stiffness constant that controls the degree to which the curves can distort, and controls the balance between internal and external forces. A typical value of k is 0.3. The resulting points for path $P_1'(t)$ after carrying out all iterations through the snake algorithm are set to the edge path: $E(t) = P_1'(t)$.

In a slight variation of Method B, the coefficients $c_1$ and $c_2$ are both chosen to be negative numbers, such as $-1$. This produces a repulsion between the snake and these edges. In this situation only one path, $P_1'(t)$ need be moved after initializing it to lie in between $P_1(t)$ and $P_2(t)$.

Step 815: Moving E(t) to the Edges in Frame t+1

Moving E(t) to the edges in the next frame occurring at time t+1 can be done using a standard snake algorithm, such as the one described in Kass, or either one of Method A and Method B described above. In one implementation, the snake algorithm of Method B is repeated with $c_1 = c_2 = 0$ and the gradients based on the image intensity values in frame t+1 instead of frame t, leaving only the edge gradient G(x,y) to produce the driving external force. After a number of iterations of the snake dynamics algorithm, typically 15, the result is the edge path E(t+1) for the object in the frame occurring at time t+1.

Step 820: Determining the Combined Local Transformation T

The transformation T can be thought of as a list of transformations, one for each point in the path E(t): $T = \{T_1, T_2, \ldots T_N\}$ corresponding to $E(t) = \{r_1, r_2, \ldots r_N\}$, so the application of T to E yields $E(t+1) = T E(t) = \{T_1 r_1, T_2 r_2, \ldots T_N r_N\}$.

For each point $r_i(t)$ in path E(t) the corresponding local transformation $T_i$ is calculated. A circle of radius R is drawn around the point. R can be controlled by the user and can take on values ranging from one pixel to the image size. Larger values of R will enable tracking to the global object motion, but may miss local distortions. Smaller values of R will enable tracking to features in the curve, which have scale sizes of the order of R.

The set of points in the edge path E(t) which lie inside the circle surrounding $r_i(t)$ form a local curve $E_{1i}$, which will be used to find the local transformation $T_i$ associated with that point. For each point of $E_{1i}$, there is a corresponding point $E_{2i}$ in the edge path E(t+1). The indices 1i and 2i have been chosen only for the simplicity of notation, and should not be considered to relate to any absolute frame numbers. The transformation $T_i(dx, dy, \theta, scaleX, scaleY)$ is found by comparing $E_{1i}$ with $E_{2i}$ as follows.

| Translation: | $dx = \langle x_2 - x_1 \rangle$ |
| --- | --- |
| | $dy = \langle y_2 - y_1 \rangle$ |
| Rotation: | $\tan \theta = \langle (x_1 y_2 - x_2 y_1)/(x_1 x_2 + y_1 y_2) \rangle$ |
| Scaling: | $scaleX = \langle x_2 x_1 \rangle / \langle x_1^2 \rangle$ |
| | $scaleY = \langle y_2 y_1 \rangle / \langle y_1^2 \rangle$ | where $\langle \ldots \rangle$ indicates the average value of the enclosed quantity carried over the set of points contained within the local curve $E_{1i}$.

Step 825: Applying the Transformation T to the Inside Path and the Outside Path

Transformation $T_i(dx, dy, \theta, scaleX, scaleY)$ is then applied to a point $r_i$ in path 1 chosen as the nearest point in path 1 to the i'th point in the edge curve $E_{1i}$ in order to produce the best approximation of $E_{2i}$ by translating, rotating, and scaling $r_i$:

| Translation: | $x_i = x_i + dx$ |
| --- | --- |
| | $y_i = y_i + dy$ |
| Rotation: | $x_i = x_i \cos\theta - y_i \sin\theta$ |
| | $y_i = y_i \cos\theta + x_i \sin\theta$ |
| Scaling: | $x_i = scaleX * x_i$ |
| | $y_i = scaleY * y_i$ |

Transformation $T_i(dx, dy, \theta, scaleX, scaleY)$ is applied to each point in $P_1(t)$. The same procedure is carried out for each point in $P_2(t)$, using the same transformation equations above, again where $r_i$ is the closest point in $P_2(t)$ to the i'th point in the edge curve. In this way, $P_1(t)$ and $P_2(t)$ are transformed locally in a manner which mimics the transformation that the edge curve has undergone between the current frame and subsequent frame.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. Accordingly, other implementations are within the scope of the following claims.

What is claimed is:

1. A method for masking a foreground portion from a background portion of a digital video, the method comprising:
receiving a first input defining a first border region that includes a border between a foreground portion and a background portion of a first digital image, the first digital image being one of a sequence of digital images defining a digital video, the first border region further including only a part of the foreground portion and only a part of the background portion, the border consisting of pixels that include contributions from the foreground portion and the background portion;
receiving a second input defining a second border region that includes the border in a second digital image, the second digital image being another one of the sequence of digital images, the second border region further including only a part of the foreground portion and only a part of the background portion;
interpolating between the first and second border regions to define an intermediary border region for an image intermediary in the sequence to the first and second digital images; and
using the first, second, and intermediary border regions for masking the foreground portion from the background portion in the digital video.

2. The method of claim 1 wherein receiving a first and a second input comprise:
receiving user inputs defining the border regions; and where interpolating an intermediary border region comprises:
interpolating an intermediary border region automatically without user input.

3. The method of claim 1 wherein using the first, second, and intermediary border regions for masking the foreground portion from the background portion comprises:
determining, for a pixel in a border region, whether the pixel includes data that is associated with the foreground portion; and
using the result of the determining step to mask the foreground portion from the background portion in the digital video.

4. The method of claim 1, further comprising the steps of:
estimating an intrinsic color value for a pixel in the first, second, and intermediary border regions; and
using the estimated intrinsic color value for extracting the foreground position from the background portion.

5. The method of claim 1 wherein receiving inputs indicating the border regions comprises:
generating an inside path located inside a foreground portion; and
generating an outside path located outside the foreground portion and enclosing the inside path,
wherein pixels between the inside and outside paths belong to a border region.

6. The method of claim 5 wherein generating an inside path and an outside path comprise:
generating a vector-based inside path and a vector-based outside path.

7. The method of claim 1 wherein receiving inputs indicating the border regions comprises:
generating a single path having a width encompassing that of the border region.

8. The method of claim 7 wherein generating a single path comprises:
generating a vector-based single path.

9. The method of claim 7 wherein generating a single path comprises:
generating a single path having variable thickness throughout its length.

10. The method of claim 1 wherein using the first, second, and intermediary border regions for masking the foreground portion from the background portion comprises:
masking the foreground portion and a portion of the border region; and
applying Gaussian blur to the portion of the border region.

11. The method of claim 10, further comprising displaying the masked foreground portion and the portion of the border region.

12. The method of claim 1 wherein using the first, second, and intermediary border regions for masking the foreground portion from the background portion comprises:
masking the foreground portion and a portion of the border region;
determining the opacities of the pixels in the portion of the border region that is displayed with the foreground portion; and
changing the opacities for pixels having opacities greater than a threshold value.

13. The method of claim 12, further comprising displaying the masked foreground portion and the portion of the border region.

14. The method of claim 1, wherein the border is a first border, the method further comprising:
receiving a third input defining a third border region tat includes a second border that is between a second foreground portion and the background portion in the first digital image, the third border region further including only a part of the second foreground portion and only a part of the background portion;
receiving a fourth input defining a fourth border region that includes the second border in the second digital image, the fourth border region further including only a part of the second foreground portion and only a part of the background portion; and
interpolating between the third and fourth border regions to define an intermediary border region for the second foreground portion for the intermediary digital image.

15. The method of claim 1 further comprising:
receiving an input defining a first internal border region, the first internal border region being enclosed by the first border region, in the first digital image;
receiving an input defining a second internal border region, the second internal border region being enclosed by the second border region, in the second digital image;
interpolating an intermediary internal border region for the image intermediary in time to the first and second digital images; and
using the first, second, and intermediary border regions, and the first internal, second internal, and intermediary internal border regions for masking the foreground portion from the background portion in the digital video.

16. The method of claim 15, wherein the first internal border region, the second internal border region, and the intermediary internal border region comprise at least a part of the foreground portion.

17. The method of claim 15, wherein the first internal border region, the second internal border region, and the intermediary internal border region comprise at least a part of the background portion.

18. The method of claim 15, wherein the first internal border region, the second internal border region, and the intermediary internal border region comprise at least a part of the foreground portion and at least a part of the background portion.

19. The method of claim 1, wherein the foreground portion is an object.

20. A method for masking an object from a background portion in a digital video, the method comprising:
   receiving a first user input defining a first border region that includes a border between an object and a background portion of a first digital image, the first digital image being one of a sequence of digital images that define a digital video, the first border region further including only a part of the object and only a part of the background portion, the border consisting pixels that include contributions from the object and the background portion;
   receiving a second user input defining a second border region that includes the border in a second digital image, the second digital image being another one of the sequence of digital images, the second border region further including only a part of the object and only a part of the background portion;
   interpolating between the first and second border regions to define an intermediary border region for an image intermediary in the sequence to the first and second digital images;
   using the first, second, and intermediary border regions for masking the object from the background portion in the digital video;
   using the first, second, and intermediary border regions for extracting the object from the background portion in the digital video; and
   placing the masked and extracted object against a new background in another digital video.

21. Computer software tangibly embodied in a computer-readable medium or a propagated carrier signal, for masking a foreground portion of from a background portion of a digital video, the software comprising instructions to perform the following operations:
   receive a first input defining a first border region that includes a border between a foreground portion and a background portion of a first digital image, the first digital image being one of a sequence of digital images that define a digital video, the first border region further including only a part of the foreground portion and only a part of the background portion, the border consisting of pixels that include contributions from the foreground portion and the background portion;
   receive a second input defining a second border region that includes the border in a second digital image, the second digital image being another one of the sequence of digital images, the second border region further including only a part of the foreground portion and only a part of the background portion;
   interpolate between the first and second border regions to define an intermediary border region for an image intermediary in the sequence to the first and second digital images; and
   use the first, second, and intermediary border regions for masking the foreground portion from the background portion in the digital video.

22. The computer software of claim 21 wherein the instructions to receive a first and a second input comprise instructions to:
   receive user inputs defining the border regions; and where interpolating an intermediary border region comprises:
   interpolate an intermediary border region automatically without user input.

23. The computer software of claim 21 wherein the instructions to use the first, second, and intermediary border regions for masking the foreground portion from the background portion comprises instructions to:
   determine, for a pixel in a border region, whether the pixel includes data that is associated with the foreground portion; and
   use the result of the determining step to mask the foreground portion from the background portion in the digital video.

24. The computer software of claim 21, further comprising instructions to perform the following operations:
   estimate an intrinsic color value for a pixel in the first, second, and intermediary border regions; and
   use the estimated intrinsic color value for extracting the foreground portion from the background portion.

25. The computer software of claim 21 wherein the instructions to receive inputs indicating the border regions comprise instructions to:
   generate an inside path located inside a foreground portion; and
   generate an outside path located outside the foreground portion and enclosing the inside path,
   wherein pixels between the inside and outside paths belong to a border region.

26. The computer software of claim 25 wherein the instructions to generate an inside path and an outside path comprise instructions to generate a vector-based inside path and a vector-based outside path.

27. The computer software of claim 22 wherein the instructions to receive inputs indicating the border regions comprise instructions to generate a single path having a width encompassing that of the border region.

28. The computer software of claim 27 wherein the instructions to generate a single pat comprise instructions to generate a vector-based single path.

29. The computer software of claim 27 wherein the instructions to generate a single path comprise instructions to generate a single path having variable thickness throughout its length.

30. The computer software of claim 21 wherein the instructions to use the first, second, and intermediary border regions for masking the foreground portion from the background portion comprise instructions to:
   mask the foreground portion and a portion of the border region; and
   apply Gaussian blur to the portion of the border region.

31. The computer software of claim 30, further comprising instructions to display the masked foreground portion and the portion of the border region.

32. The computer software of claim 21 wherein the instructions to use the first, second, and intermediary border regions for masking the foreground portion from the background portion comprise instructions to:
  mask the foreground portion and a portion of the border region;
  determine the opacities of the pixels in the portion of the border region that is displayed with the foreground portion; and
  change the opacities for pixels having opacities greater than a threshold value.

33. The computer software of claim 32, further comprising instructions to display the masked foreground portion and the portion of the border region.

34. The computer software of claim 21, wherein the border is a first border, the computer software further comprising instructions to perform the following operations:
  receive a third input defining a third border region that includes a second border that is between a second foreground portion and the background portion in the first digital image, the third border region further including only a part of the second foreground portion and only a part of the background portion;
  receive a fourth input defining a fourth border region that includes the second border in the second digital image, the fourth border region further including only a part of the second foreground portion and only a part of the background portion; and
  interpolate between the third and fourth border regions to define an intermediary border region for the second foreground portion for the intermediary digital image.

35. The computer software of claim 21 further comprising instructions to perform the following operations:
  receive an input defining a first internal border region, the first internal border region being enclosed byte first border region, in the first digital image;
  receive an input defining a second internal border region, the second internal border region being enclosed by the second border region, in the second digital image;
  interpolate an intermediary internal border region for the image intermediary in time to the first and second digital images; and
  use the first, second, and intermediary border regions, and the first internal, second internal, and intermediary internal border regions for masking the foreground portion from the background portion in the digital video.

36. The computer software of claim 35, wherein the first internal border region, the second internal border region, and the intermediary internal border region comprise at least a part of the foreground portion.

37. The computer software of claim 35, wherein the first internal border region, the second internal border region, and the intermediary internal border region comprise at least a part of the background portion.

38. The computer software of claim 35, wherein the first internal border region, the second internal border region, and the intermediary internal border region comprise at least a part of the foreground portion and at least a part of the background portion.

39. The computer software of claim 21, wherein the foreground portion is an object.

40. Computer software, tangibly embodied in a computer-readable medium or a propagated carrier signal, for masking an object from a background portion in a digital video, the software comprising instructions to perform the following operations:
  receive a first user input defining a first border region that includes a border between an object and a background portion of a first digital image, the first digital image being one of a sequence of digital images that define a digital video, the first border region further including only a part of the object and only a part of the background portion, the border consisting of pixels that include contributions from the object and the background portion;
  receive a second user input defining a second border region that includes the border in a second digital image, the second digital image being another one of the sequence of digital images, the second border region further including only a part of the object and only a part of the background portion;
  interpolate between the first and second border regions to define an intermediary border region for an image intermediary in the sequence to the first and second digital images;
  use the first, second, and intermediary border regions for masking the object from the background in the digital video;
  use the first, second, and intermediary border regions for extracting the object from the background portion in the digital video; and
  place the masked and extracted object against a new background in another digital video.

* * * * *

UNITED STATES PATENT AND TRADEMARK OFFICE
CERTIFICATE OF CORRECTION

PATENT NO. : 7,003,061 B2 Page 1 of 1
APPLICATION NO. : 09/747945
DATED : February 21, 2006
INVENTOR(S) : Gregg D. Wilensky It is certified that error appears in the above-identified patent and that said Letters Patent is hereby corrected as shown below:

Column 17, line 55, delete "position" and replace with --portion--;
Column 18, line 36, delete "tat" and replace with --that--;
Column 19, line 49, delete the first occurrence of "of";
Column 20, line 49, delete "pat" and replace with --path--;
Column 21, line 33, delete "byte" and replace with --by the--.

Signed and Sealed this

Twenty-fifth Day of July, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,003,061 B2 | Page 1 of 1 |
| APPLICATION NO. | : 09/747945 | |
| DATED | : February 21, 2006 | |
| INVENTOR(S) | : Gregg D. Wilensky | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 592 days Delete the phrase "by 592 days" and insert -- by 631 days--

Signed and Sealed this

Second Day of October, 2007

JON W. DUDAS
*Director of the United States Patent and Trademark Office*